(12) United States Patent
Gautheron

(10) Patent No.: US 9,809,338 B2
(45) Date of Patent: Nov. 7, 2017

(54) DEVICE AND METHOD FOR LOADING A STORAGE AREA

(71) Applicant: C.E.R.M.E.X. CONSTRUCTIONS ETUDES ET RECHERCHES DE MATERIELS POUR L'EMBALLAGE D'EXPEDITION, Corcelles-les-Citeaux (FR)

(72) Inventor: Anthony Gautheron, Corcelles-les-Citeaux (FR)

(73) Assignee: C.E.R.M.E.X. CONSTRUCTIONS ETUDES ET RECHERCHES DE MATERIELS POUR L'EMBALLAGE D'EXPEDITION, Corcelles-les-Citeaux (FR)

( * ) Notice: Subject to any disclaimer, the term of this patent is extended or adjusted under 35 U.S.C. 154(b) by 0 days.

(21) Appl. No.: 15/196,294

(22) Filed: Jun. 29, 2016

(65) Prior Publication Data
US 2017/0001741 A1    Jan. 5, 2017

(30) Foreign Application Priority Data

Jun. 30, 2015 (FR) ..................................... 15 56107

(51) Int. Cl.
*G06F 7/00* (2006.01)
*B65B 43/18* (2006.01)
(Continued)

(52) U.S. Cl.
CPC .............. *B65B 43/185* (2013.01); *B31B 1/06* (2013.01); *B65G 59/04* (2013.01); *B65H 1/30* (2013.01);
(Continued)

(58) Field of Classification Search
None
See application file for complete search history.

(56) References Cited

U.S. PATENT DOCUMENTS

| 4,545,183 A | 10/1985 | Stohlquist et al. |
| 5,116,303 A | 5/1992 | Dietrich et al. |

(Continued)

FOREIGN PATENT DOCUMENTS

| FR | 2 563 494 A1 | 10/1985 |
| WO | 98/52826 A1 | 11/1998 |
| WO | 2008/047008 A1 | 4/2008 |

OTHER PUBLICATIONS

Letter from a third party, dated Jul. 13, 2017, addressed to Young & Thompson.
(Continued)

*Primary Examiner* — Yolanda Cumbess
(74) *Attorney, Agent, or Firm* — Young & Thompson

(57) ABSTRACT

A loading device to supply successively with cardboard sheets a station for handling the sheets by folding to form from them boxes for packaging, the handling station having a storage area to receive the successive sheets, optionally grouped in bundles, the device itself having a manipulator that includes: a gripping tool to pick up the sheets; an actuator to move the tool between an inventory of sheets and the receiving storage area of the station; a detection unit for detecting the status of filling of the storage area; and a control unit that directs the action of the device and that receives detection information from the detection unit to do this, the control unit being independent of the control of the handling station and programmable to adapt the operation of the loading device to the type of sheets handled. A corresponding process is also described.

20 Claims, 4 Drawing Sheets

(51) Int. Cl.
- B65H 1/30 (2006.01)
- B65H 5/00 (2006.01)
- B65H 7/04 (2006.01)
- B31B 1/06 (2006.01)
- B65G 59/04 (2006.01)
- B65H 3/08 (2006.01)
- B65H 5/08 (2006.01)

(52) U.S. Cl.
CPC ........... *B65H 3/0808* (2013.01); *B65H 5/006* (2013.01); *B65H 5/085* (2013.01); *B65H 7/04* (2013.01); *B31B 2201/0282* (2013.01); *B65H 2301/342* (2013.01); *B65H 2301/4221* (2013.01); *B65H 2301/42242* (2013.01); *B65H 2402/10* (2013.01); *B65H 2511/51* (2013.01); *B65H 2511/515* (2013.01); *B65H 2513/40* (2013.01); *B65H 2555/31* (2013.01); *B65H 2701/176* (2013.01); *B65H 2701/1764* (2013.01)

(56) References Cited

U.S. PATENT DOCUMENTS

| | | | |
|---|---|---|---|
| 5,970,834 A | 10/1999 | Garofano et al. | |
| 2003/0005662 A1 | 1/2003 | Ishii et al. | |
| 2012/0305636 A1* | 12/2012 | Capoia | B65D 5/5033 229/199 |
| 2014/0222203 A1 | 8/2014 | Sauvageot | |
| 2015/0024917 A1* | 1/2015 | Nadachi | B31B 1/36 493/53 |
| 2015/0063973 A1* | 3/2015 | Girtman | B25J 9/0093 414/796.9 |

OTHER PUBLICATIONS

Concise Description for Dietrich et al., U.S. Pat. No. 5,116,303 (filed May 26, 1992). 2017.
Concise Description for Grafano et al., U.S. Pat. No. 5,970,834. 2017.
Concise Description for Ishii et al. U.S. 2003/0005662 (filed Jan. 9, 2003). 2017.
Concise Description for Sauvageot, U.S. 2014/0222203, dated Aug. 7, 2014 (filed Feb. 5, 2014). 2017.
Bouchard, S. (Sep. 30, 2014). 7 Types of Industrial Robot Sensors. Retrieved Jul. 3, 2017, from http://blog.robotiq.com/bid/72633/7-Types-of-Industrial-Robot-Sensors.
Concise Description for ROBOTIQ—7 Types of Industrial Robot Sensors, Sep. 30, 2014 (with screenshots and transcription of embedded video, Collaborative Robotics and Functional Safety). 2017.
ABB Robotics. (Sep. 24, 2010). ABB Robotics—Picking and Packing stock cubes. Retrieved Jul. 3, 2017, from https://www.youtube.com/watch?v=2Akj_3qgxQs.
Concise Description for ABB Robotics—Picking and Packing stock cubes (Sep. 24, 2010). 2017.
Alligator Automations—Automatic Carton Erector. (Aug. 28, 2013). Retrieved Jul. 03, 2017, from https://www.youtube.com/watch?v=3LIDFVPuSZ4.
Concise Description for Alligator Automation Automatic Carton Erector (Aug. 28, 2013) (screenshots of Youtube® video). 2017.
Bückle, J., & Huber, W. (2005). Manual of packing and palletising technology: the state-of-the-art dry end in theory and practice. Hamburg: Behr's Verlag.
Concise Description for Manual of Packing and Palletising Technology: State-of-the-art dry end in theory and practice (2005). 2017.
(2013). SMI now Magazine, Nov. 2013 with supporting declaration.
Concise Description for SMI now Magazine Sep. 2013 (Sep. 2013) (with supporting declaration). 2017.
Stork. (1999). Robotics Expertise at Holland's biggest brewer [Brochure]. (with supporting declaration) (published at least as early as Feb. 4, 1999).
Concise Description for STORK Robotics Expertise at Holland's biggest brewer (brochure) (with supporting declaration) (published at least as early as Feb. 4, 1999). 2017.

* cited by examiner

DEVICE AND METHOD FOR LOADING A STORAGE AREA

FIELD OF THE INVENTION

This invention relates to the field of the packaging of products by packing and has as its object, on the one hand, a device supplying sheets intended to form cardboard boxes, and, on the other hand, a process using this device.

BACKGROUND OF THE INVENTION

In this field, the products are handled industrially in a series of stations; then, once the products are finished, they are sent to be put into a cardboard box. These cardboard boxes are obtained from flat cardboard sheets that are erected within a box-forming means.

For example, WO2008047008, which has a solution for picking up sheets and then forming boxes, is known. This box-forming station has a storage area equipped with a conveyor, on which the successive sheets are placed, to be then picked up one after the other by a system of suction means. The sheets in the storage area are approximately vertical.

WO9852826 exhibits a unit for forming open boxes, where a turnstile picks up sheets from the storage area one after the other. The conveyor in the area of the mouth of the storage area exhibits an incline that has the effect of tilting the sheets forward and of facilitating their being picked up.

A box former is also described in FR2563494.

In the field of the invention, it is therefore necessary to regularly supply such a station with pre-cut, even pre-folded, flat sheets that are present on a pallet in the area of the station. This supplying is done generally manually, by an operator who must then be assigned to said station, at the risk that he might overload the storage area if working simultaneously on other machines.

SUMMARY OF THE INVENTION

The invention thus aims to facilitate and automate the supplying of pre-cut sheets from a supplying storage area as a function of box forming, a storage area in which the sheets are stored behind one another approximately vertically, and with the most versatile solution possible, and thus compatible without a major redesign with the largest number of stations possible, but also able to handle a very large group of sheets, in terms of dimensions, in bundle configurations or not.

To do this, the invention proposes to supply the storage area using a loading device that is automated and autonomous relative to the station supplied, able itself to detect the status of the storage area that it must stock up, and also able, in a particularly preferred embodiment, to handle a very wide range of sheets or bundles considering its compactness, its power and its pick-up process.

The invention thus has as its object a loading device to successively supply cardboard sheets to a handling station for handling said sheets by folding to form them into boxes for packaging, said handling station having a storage area to receive the successive sheets, which may be grouped in bundles, where said loading device has a manipulator that comprises a grasping tool to pick up said sheets, and an actuator to move the grasping tool between an inventory of sheets and the receiving storage area of the station.

This loading device is characterized in that it comprises, on the one hand, a detection means for detecting the status of filling of the storage area, as well as, on the other hand, a control unit, that directs the action of the loading device and receives detection information from the detection means to do this, said control unit being independent of the control of the handling station and programmable to adapt the operation of the loading device to the type of sheets handled.

The invention also has as its object a method that is implemented by the loading device, namely a process for loading bundles of sheets into a storage area of a handling station that folds said sheets to obtain boxes from them, comprising a step of transferring, into said storage area, sheets from an inventory, using a manipulator of a loading device.

This method is characterized in that it further comprises steps of detecting the load status of the storage area using a detection means of said loading device, and implementing the manipulator on the basis of this detection as well as by way of a predefined program governed by a control unit of the loading device that does not control the operation of the handling station.

BRIEF DESCRIPTION OF THE DRAWINGS

The invention will be better understood thanks to the description below, which is based on preferred, non-limiting embodiments, explained in a way that is illustrative and in no way limiting, with reference to the accompanying figures, in which.

DETAILED DESCRIPTION OF THE INVENTION

Figure 1:
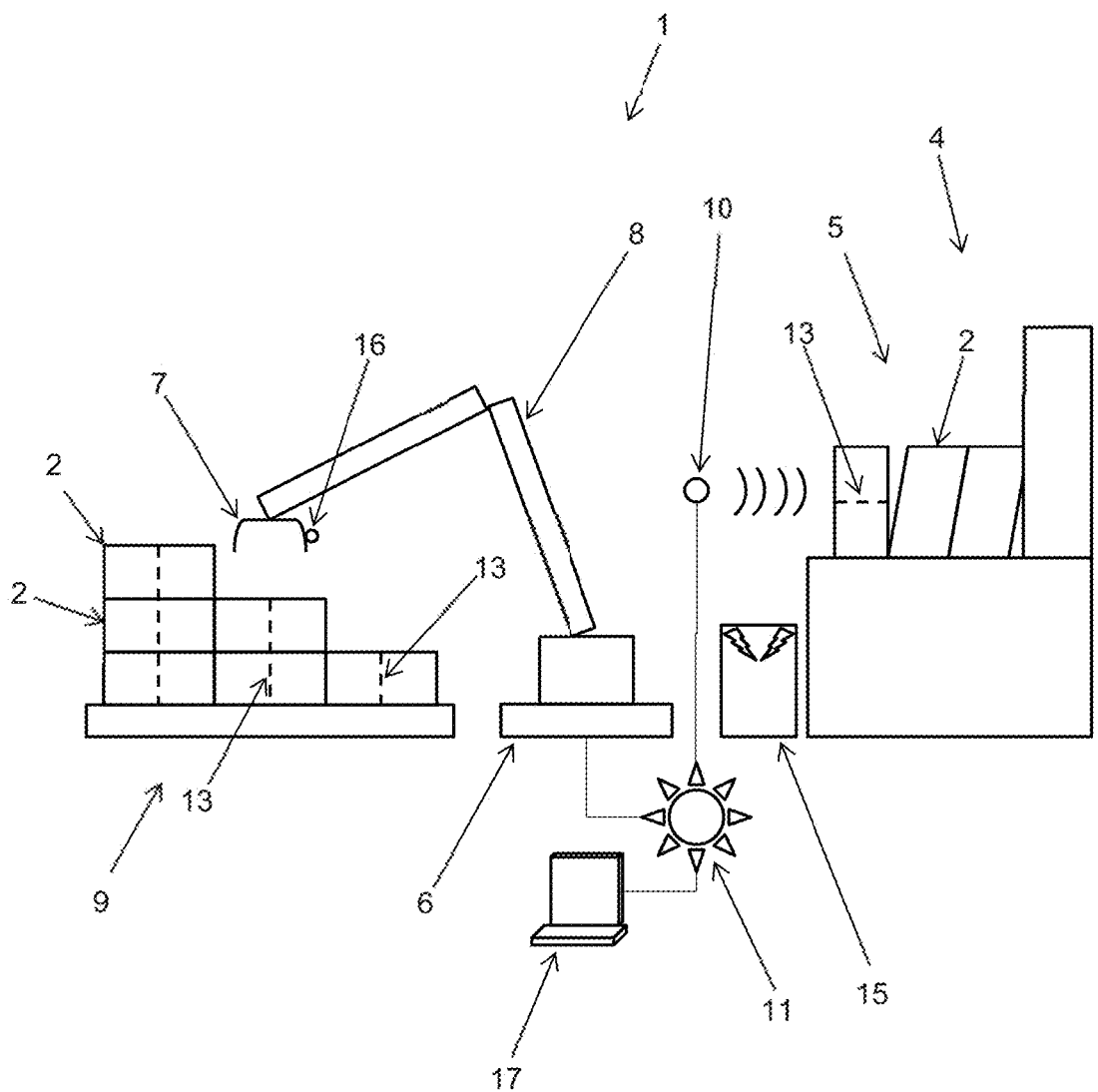
FIG. 1 shows an overall view of a loading device, between an inventory and a storage area that it supplies.

The invention first of all therefore has as its object a loading device 1 to successively supply cardboard sheets 3 to a handling station 4 that folds said sheets 3 to form packing boxes from them, said handling station 4 having a storage area 5 that receives the successive sheets 3, which may be grouped in bundles 2, where said loading device has a manipulator 6 comprising a gripping tool 7 for picking up said sheets 3, and an actuator 8 to move the tool 7 between an inventory 9 of sheets 3 and the receiving storage area 5 of the handling station 4.

The handling station 4 therefore ensures at least a function for forming boxes from essentially flat cardboard sheets 3 and has a storage area 5 where waiting sheets 3 are stored. The handling station 4 may also itself carry out the function of packing, i.e., the transfer of products, received in an assembly line, into the formed boxes.

The sheets 3 are generally one-piece and define all or part of the future box, optionally with sturdy flaps. It is by unfolding and folding that the handling station 4 transforms the flat sheets 3 into a box with a volume for subsequent accommodation for the products. The boxes obtained in a standard way have a bottom, normally intended to be horizontal, and sides normally intended then to be vertical and perpendicular in pairs. The bottom, and optionally a lid, opposite the bottom, can be obtained by flaps that extend from the sides of the sheet. The various elements of the sheet 3 are generally attached to one another, by gluing, adhesive tape, staples, or the like, for better stability.

It is understood that as a function of the flow of products entering the handling station 4, the handling station 4 consumes a certain flow of sheets 3, and that it is then necessary to regularly stock the storage area 5 of the handling station 4. The storage area 5 is stocked from an inventory 9, generally in the vicinity of the handling station 4, at which the sheets 3 are stored in a large quantity, generally in the form of a pallet containing a large number of stacked sheets 3. The invention proposes to perform the stocking of this storage area 5 by a loading device 1 that is autonomous and can be installed to stock a handling station 4 without structural modification of the handling station 4.

The loading device 1 has a manipulator 6 comprising a gripping tool 7, and an actuator 8 that moves the tool 7. The actuator 8 is preferably of the multi-axis robot type, at the end of which the tool 7 is mounted.

The tool 7 moves the sheets 3 from the inventory 9 and brings them into the storage area 5. The tool 7 picks up at least one sheet 3 each time. In a preferred embodiment, the sheets 3 are organized into self-supported bundles 2 of stacked sheets 3, the sheets 3 that make them up being connected to one another by a binding 13. In this embodiment, the tool 7 picks up an end sheet 3 from this stack to bring along the entire bundle 2. In each operation, the loading device 1 deposits one sheet 3, and, preferably, a bundle 2 of sheets 3, into the storage area 5. The handling station 4 itself uses the sheets 3 present in the storage area 5 one by one.

According to the invention, the loading device 1 comprises, on the one hand, a detection means 10 to detect the status of filling the storage area 5, as well as, on the other hand, a control unit 11 that directs the action of the loading device and that receives detection information from the detection means 10 to do this, said control unit 11 being independent of the control of the handling station 4 and programmable to adapt the operation of the loading device 1 to the type of sheets 3 handled by the handling station 4.

The control unit 11 of the loading device directs the movement of the manipulator 6 and sets it in motion as a function of the needs of the handling station 4 to stock its storage area 5. To do this, the control unit 11 receives a signal that is transmitted by the detection means 10 that represents the status of filling of the storage area 5. The loading device 1 is therefore autonomous and alone acquires data that is representative of the status of the storage area 5 so as to restock the storage area, as necessary, by a suitable command from the manipulator 6. The control unit 11 governs the operation of the manipulator 6 in accordance with a pre-defined program, which determines, for example, the thresholds from which to begin or to stop stocking the storage area 5, the dimensions of sheets 3 or of bundles 2 to be handled, and preferably, an exact place where the tool 7 must pick up the sheet 3 or the bundle 2, a force to be exerted, etc.

The control unit 11 is specific to the loading device 1 in the sense that the loading device 1 is not directed by the directing element of the handling station 4. It is therefore easy to incorporate such a loading device 1 into an existing handling station 4, and the compatibility conditions are limited. The control unit 11 also makes it possible to modify the program in accordance with which the manipulator 6 is used. It is thus possible for an operator to modify the operating parameters of the manipulator 6.

Such a loading device 1 is very versatile since it can be adapted to practically all existing handling stations 4 equipped with a storage area 5, but it is also able to handle a large group of sheets 3 or bundles 2, or at least may be easily configured or reconfigured autonomously to do this.

The control unit 11 can be embodied as a computer equipped with a programming interface, for example. Communication with the manipulator and/or the detection means 10 can be through wire or wireless.

The control unit 11 is therefore used to direct the movement of the manipulator 6 to pick up, as soon as necessary, a bundle 2 or a sheet 3, and to bring it into the storage area 5.

The programming of the paths between the inventory 9 and the storage area 5 can be done in a step during which an operator manually moves the gripping tool 7 between the inventory 9 and the storage area 5, wherein the movement to which said tool 7 is subjected being detected fully or in a point manner, followed and recorded by the control unit 11 as a path to be reproduced subsequently during normal operation.

It will be understood that the number of inventories 9 from where the sheets 3 are pulled as well as the number of stations 4 supplied is arbitrary, since the loading device 1 can supply one or more different stations 4, from one or more different inventories 9, which may contain sheets 3 of different sizes, or bundles 2 of different sizes. The detection means 10 is thus suited to the plurality of storage areas 5 to be supplied. Conventionally, the detection means 10 assumes the shape of an object detection cell positioned in the storage area 5 to be stocked and is able to detect the sheets 3.

According to a preferred embodiment of the invention, the tool 7 is equipped with a sensor 16 that detects the sheets 3 able to scan and detect the shape of the assembly of sheets 3 in the inventory 9. The sheets 3 are stacked in the inventory 9, and consequently it is necessary to identify their exact position before seeking to move them with the manipulator 6. Therefore, the object-detecting sensor 16 of the tool 7 is sensitive to the presence of sheets 3. The manipulator 6 can then be controlled so that the tool 7 equipped with the sensor 16 scans the volume where the sheets 3 should be found in the inventory 9. It will be noted that the sensor 16, mounted on the tool 7, can, in a particular embodiment operate as the detection means 10. A same device then operates as both the sensor 16 mounted on the tool 7 and the detection means 10 that quantifies the contents of the storage area 5.

The detecting zone of the sensor 16 is oriented toward the location where the sheets 3 should be found so as to detect the presence of the sheets 3 and thus to identify their position. The manipulator 6 operates to characterize, by way of the tool 7 that carries out the scanning, a boundary occupied by the assembly of the sheets 3 in the inventory 9. This data is then sent to the control unit 11, which analyzes the data and deduces, for example, the dimensions of the sheets 3 and/or the bundles 2. The control unit 11 initiates this detection program and therefore uses the result to send the tool 7 to look for the sheets 3 where they are found. This surveillance cycle can be used at the beginning of a series, when a pallet of sheets 3 has just been brought, or else during a series, to verify the good configuration of the sheets 3.

This contributes to the autonomy of the loading device 1 and to its versatility relative to many possible technical environments.

According to another preferred embodiment of the invention, the tool 7 is equipped with a gripper 12 to pick up a binding 13 that, while forming a closed loop, restrains the sheets 3 of the bundle 2, and, with a cutting means 14 configured to cut such a binding 13. In a particularly preferred embodiment, the loading device 1 further includes a shredder 15 that cuts the binding 13 into pieces.

As has already been mentioned, in certain configurations, the sheets 3 are bound in a bundle 2 by bindings 13, in the form of plastic bands. A single binding 13 is generally used to form a bundle 2. This binding 13 must be removed so that the station 4 can form the boxes from the sheets 3 one by one. In such cases, the preferred embodiment loads the bundles 2 themselves into the storage area 5 and cuts the bindings 13 only after this transfer from the inventory 9 to the storage area 5. To maintain a loading device 1 that is simple and able to handle sheets 3 bound in bundles 2, the tool 7 of the invention is advantageously equipped directly with a cutting means 14 that, once the bundle 2 is loaded into the storage area 5, cuts the binding 13 to open it, thereby to render the sheets 3 independent. The gripper 12 assumes the shape of a directed vise to be closed once it surrounds the binding 13. The cutting means 14 includes a movable slicing blade that cuts the binding 13 when it is taken into said vise.

The tool 7 of the preferred embodiment therefore has a gripper 12 to pick up the binding 13, as well as a cutting means 14 that slices the binding when it is picked up by the gripper 12. With the binding 13 continuing to be grasped by the gripper 12, the tool 7 is moved to disengage the binding 13 from the sheets 3, and optionally brings it into a zone where it will be handled and destroyed, for example by reducing it to little pieces.

According to another preferred embodiment of the invention, the tool 7 is equipped with a set of pneumatic suction cups 19 to pick up, from above, a sheet 3, or a bundle 2. In the exemplary configuration illustrated in FIG. 2, the tool 7 is equipped with suction cups located at the end of a housing 23 or structural shell surrounding the "core" elements of the tool 7 (e.g., the gripper 12, venturis that supply vacuum to the suction cups, and optionally the cutting means 14 and/or the sensor 16), and in which, optionally, lines for the suction cups 19 run. The suction cups 19 are able to exert a considerable force on the sheet 3 against which they are applied. They are, in addition, close to one another so that the outside footing of the tool 7 is significantly small relative to the force that it can exert on the sheet 3 against which the suction cups 7 come. Such a tool is therefore particularly versatile since it is able to handle sheets 3 ranging from small dimensions barely larger than the footing of the compact assembly of suction cups 19 and therefore of the tool 7, up to heavy bundles 2 of multiple sheets 3 of much larger dimensions than said footing, as a result of the force of the suction cups 19.

The loading device 1 is thus particularly versatile.

According to a yet further preferred embodiment of the invention, the loading device 1 is able to detect intrusions of the manipulator 6 into the work environment, and as a consequence to alter the operation of the manipulator 6, so as to avoid risks of collision with operators, said loading device 1 then being free of a cover that restricts access by the operators to the work environment of the device. For example, the invention may include a set of sensors placed in the environment of the manipulator 6, which sends to the control unit 11 signals that are representative of a presence detected in the work zone of said manipulator 6, which is more or less nearby. As soon as a presence is detected, the operation of the manipulator 6 goes into downgraded mode as a function of the associated risk, which may include up to a complete shutdown. In a particularly preferred embodiment of the invention, the manipulator 6 itself can be equipped with the sensors that detect a presence, and may also detect an impact or an abnormal contact. Signals from such sensors can be taken into account by the manipulator 6 itself or by the control unit 11.

The advantage of equipping the loading device 1 with such a safety function is to be able to eliminate the covers and other solutions that limit operator access from the work zone of the manipulator 6. Consequently, such a loading device 1 is easy and not very expensive to install and put into place in the environment of an existing handling station 4, whereas its operation remains safe and the risks limited.

The scope of the invention also includes a process for using the device as described above, namely a process for loading bundles 2 of sheets 3 into a storage area 5 of a handling station 4 for handling by the folding of said sheets 3 to obtain boxes from them, comprising a step of transferring, into said storage area 5, sheets 3 from an inventory 9, using a manipulator 6 of a loading device 1. As has already been said, the inventory 9 generally takes the shape of a pallet on which the sheets 3 are stacked, and which may be packaged in bundles 2, in which case the sheets 3 are transferred by bundle 2. Of course, this process can be used to operate the loading device 1 so that it supplies several different handling stations 4, which in turn may have several storage areas 5 each, and the sheets 3 may come from several inventories 9, and may have different sizes. The device can therefore be used as a supply means that distributes different sheets 3 in different forms, i.e., by the unit or by bundle 2, but also in different templates, from several different inventories 9 to several different storage areas 5, and it therefore acts as a distribution center for the sheets 3. Preferably, the manipulator 6, however, remains anchored to the ground and the at least one inventory 9 and the at least one storage area 5 are found in the action zone or work environment of said manipulator 6.

According to the invention, the process comprises steps of detecting the load status of the storage area 5 using a detection means 10 of said loading device 1, and using the manipulator 6 on the basis of this detection as well as by way of a pre-defined program governed by a control unit 11 of the loading device 1 that does not control the operation of the handling station 4, in particular a control unit 11 dedicated to the loading device 1, particularly a control unit 11 that makes it possible for a user to modify said program using a programming tool 17 such as a computer, for example.

The control unit 11 is therefore specific to the loading device 1 and the detection means 10, although mounted so as to detect the presence of sheets 3 in the storage area 5, and is connected to said unit to provide it with the data necessary for the operation of the manipulator 6 that transfers the sheets 3 to said storage area 5, so as to guarantee optimal filling.

According to a preferred additional feature of the process, a step is carried out of detecting the load status of the inventory 9 using the manipulator 6 itself, by movement of a sensor 16 taken onto a tool 7 that is mounted on an actuator 8 of the manipulator 6. This step is carried out at the beginning of the operating cycle, when an entirely or partially full pallet is brought to the inventory 9, such as during the operation to check the status of the inventory 9. Alternatively, this step confirms the template of the sheets 3, of the bundles 2 themselves. This signal representing the status of filling of the inventory 9 is therefore taken into account by the control unit 11 that governs the movement of the manipulator 6, to decide in particular on the exact location where the tool 7 must come to look for the sheets 3 or the bundles 2, and also may carry out an alert procedure from the moment that a fault is detected in the inventory 9, of the type where the inventory 9 is empty or sheets 3 have fallen, etc.

According to another preferred additional feature of the process, a step is carried out to open a bundle 2 of sheets 3, by cutting a slender binding 13 that holds the sheets 3 of said bundle 2 together, using a cutting means 14 located on the tool 7 mounted on the actuator 8 of the manipulator 6. The transfer of sheets 3 to the storage area 5 is then performed by bundle 2, which, of course, reduces the frequency of the transfers. According to this embodiment, it is not necessary that the operator intervene to cut the binding 13, and, since the cutting means 14 is mounted on the tool 7 and therefore incorporated in the loading device 1, it is not necessary to complete the installation with an additional device.

In possible embodiments where the products 3 appear in a bundle 2 in the inventory 9, several bundles 2 provided with bindings 13 are deposited successively in the storage area 5, and the cutting step is not carried out for the last bundle 2 deposited. Thus, at least the last bundle 2 deposited in the storage area 5 forms a pack of sheets 3 that are held together and that therefore do not run the risk of sliding and spreading out flat in the storage area 5 where they must normally be oriented nearly vertically. This pack is therefore relatively stable relative to the same number of sheets 3 that are not connected together, and then stabilizes the upstream sheets 3, which can then be freed from one another by the cutting of the bindings 13 of their respective bundles 2.

Preferably, at the time of depositing a new bundle 2 in the storage area 5, the binding 13 of the preceding bundle 2 is cut, so that only the last bundle 2 in the storage area 5 is fastened by a binding 13.

Since the cutting means 14 is mounted on the tool 7, and the tool 7 is present in the storage area 5 since it has just deposited the last bundle 2 there, it is relatively fast to move the tool 7 to the preceding bundle 2 to cut the binding 13 from it.

Finally, according to a further advantageous preferred embodiment of the invention, the the gripping tool 7 comprises a set of suction cups, and the picking up of the bundle 2 is performed by positioning the tool 7 approximately in the middle between the two large edges of the sheets 3, in the area of the short edge that is far from a zone of the folding of the sheet 3. The predefined program of the control unit 11 positions the tool 7 at this location once the status of the inventory 9 and therefore the exact position of the stack of rectangular sheets 3, as well as the dimensions of the sheets 3, are determined. It has been found that by picking up the sheet 3 from above at this location, its deformation when the sheets 3 are in a bundle 2 formed by a binding 13 is minimized. This positioning of the tool 7 contributes to the versatility of the loading device 1 that can then lift sheets 3 or bundles 2 without excessive damage. This positioning is thus ideal for the different configurations of sheets 3 that are possible.

According to a yet further preferred embodiment of the invention, during the travel between the inventory 9 and the storage area 5, the bundle 2 is brought at least temporarily to bear on an outside support, relative to which it is then moved, by rotation and/or translation. In the cases where the manipulator 6 picks up bundles 2 that are each bound by a binding 13, the picking up by the upper sheet 3 causes the upper sheet 3 to be deformed relative to the other sheets that it carries along under it as a result of the binding 13. The program of the control unit 11 then preferably makes allowance for the dimensions of the sheets 3 and/or of the bundle 2 to adapt the path of the bundle 2 between the inventory 9 and the storage area 5 so as to minimize the deformation of the first sheet 3, and/or to minimize the deformation of the whole bundle 2. Rotations around a horizontal axis can thus be provided during the travel, or else the depositing of the bundle 2 in the storage area 5 followed by movements of rotation for repositioning the bundle 2. The bundle 2 can be brought to bear on a support surface, in the area of a section or of a side, and then be pivoted or moved in translation, which also makes it possible to stabilize the bundle 2 and thus to reposition the sheets 3 against one another, aligned.

In the embodiment illustrated in the accompanying figures, the loading device 1 comprises a manipulator 6 with a robotic-type actuator 8 having articulated arms, and, mounted at the end of one of these arms, a gripping tool 7. The loading device 1 is mounted to act between a zone where an inventory 9 of bundles 2 of sheets 3 is found, and a storage area 5 of a handling station 4. The handling station 4 therefore ensures at least a function of forming boxes from sheets 3, and also in a preferred embodiment, a function of packing, (i.e., placing of the products into the box that is formed).

The sheets 3 are therefore initially packaged in bundles 2, placed on one another, and preferably bound together by a closed, flexible binding 13 that holds them together in a unit. This unit is more or less rigid, depending on the rigidity of the constituent sheets 3 and on the play between the binding 13 and the sheets 3 of the bundle 2. These bundles 2 can comprise several sheets 3, and even several scores of sheets, stacked and against one another. The bundles 2 are thus placed on a pallet, forming an input inventory 9. It is understood that a pallet can be loaded with several layers, each comprising several bundles 2 beside one another. The bundles 2 are then loaded by the loading device 1 into the storage area 5 of the handling station 4. A cardboard box is erected by the handling station 4 from each sheet 3 taken individually. The handling station 4 therefore successively uses the sheets 3 of the bundles 2 present in its storage area 5. The storage area 5 is generally provided with a conveyor belt that successively advances the bundles 2 or the sheets 3 to the pick-up area by the handling station 4. A subsequent step within the handling 4 can be the packing, i.e., the filling, with products of the jar, bottle, or other type, of the boxes formed using the sheets 3.

The essential function of the loading device 1 therefore is to transfer the bundles 2 from the inventory 9 to the storage area 5, so as to ensure that the storage area 5 is always supplied and so that the handling station 4 can operate without interruption.

The loading device 1 can, of course, be used to supply several different handling stations 4, optionally from the same inventory 9. The loading device 1 is thus able to load several storage areas 5 and therefore several different handling stations 4, from one or more inventories 9.

The sheets 3 are deposited singly or by bundle 2 from the inventory 9, and the manipulator 6 is equipped with a gripping tool 7 that is compatible with the characteristics of weight and dimensions of the object to be transported: bundle 2, stack of sheets 3, sheet 3, etc. As will be described further on, the bundles 2 are picked up from above by a tool 7 in the area of their upper sheet 3, opposite the sheet 3 with which the bundle 2 is in contact with the bundle 2 under it. Generally, clamp tools 7 can also be used, the bundles 2 being picked up by their sides.

The loading device 1 also preferably comprises a detection means 10, and a control unit 11. The detection means 10 follows the status of filling of the storage area 5 and provides this information to the control unit 11 that directs the loading device 1, in particular the movement of the manipulator 6. The control unit 11 of the loading device 1 is disconnected from the handling station 4, and, unlike a direction center that is common both to the loading device 1 and to the at least one machine or station receiving the sheets 3, the control unit 11 of the loading device 1 does not control the station 4. The handling station 4 is thus equipped with its own command center, which governs its operation according to a processing logic as well as different sensors with which it is equipped. Thus, in a preferred embodiment of the invention, the command center of the handling station 4 does not ensure the operation of the loading device 1 and is not connected to it. The control unit 11 of the loading device 1 therefore directs the operation of the loading device 1, but not the operation of the handling station 4. Conversely, the command center of the handling station 4 does not direct the operation of the loading device 1.

The control unit 11 is therefore independent of the handling station 4, and the loading device 1 forms an autonomous module that can easily be added onto an existing handling station 4, without requiring modification of its directing element, without reprogramming or the like. If necessary for the proper operation of the loading device 1 and of the handling station 4, information exchanges between the control unit 11 and the command center of the handling station 4 can be implemented. For example, a piece of information representing the number of sheets 3 required for a complete production cycle by the handling station 4 can be taken into account by the control unit 11 so as to avoid filling the storage area 5 beyond the quantity that will actually be used during this production cycle. Overloading the storage area 5 and potentially having to throw away sheets 3 present in the storage area 5 once the production cycle has ended are thus avoided. It is also possible to anticipate a change in size and to transfer in sufficient time a number of sheets 3 still required for the production cycle, which makes it possible to free up the pallet earlier, even though the production cycle is still not finished.

The loading device 1 is preferably equipped with a detection means 10 to measure the status of the filling of at least one storage area 5 that it supplies. The detection means 10 can be, for example, a proximity detector oriented toward the area where the bundles 2 and sheets 3 are positioned against one another and which eventually come to be positioned within the storage area 5. The detection means 10 can also be a sensor 16 mounted on the tool 7. Of course, it will be understood that if the loading device 1 is required to supply several handling stations 4, the measurement is performed in each storage area 5 and the detection means 10 is adapted and then comprises the necessary number of cells. The detection means 10 is connected to the control unit 11 that receives a signal that corresponds to the quantity of sheets 3 present in the at least one storage area 5 to be filled. The control unit 11 then uses this signal to put the manipulator 6 in action to bring new bundles 2 of sheets 3 into the storage area 5 in accordance with a processing logic of the type that initiates a transfer to the storage area 5 as soon as the quantity of sheets 3 is found between two predefined thresholds, etc. In a preferred embodiment, the signal representing the quantity of sheets 3 in the storage area 5 comes from a device of the handling station 4 itself, such as from its own command unit.

The loading device 1 is therefore operated autonomously, and its program can preferably be modified by a user with the aid of a programming tool 17 of which said loading device 1 makes use. Such a modification of the operation can, for example, be accomplished with a computer. As a result of this programming tool 17, the operation of the loading device 1 can be modified to take into account a new size of sheet 3 or of bundle 2, for example, or new dimensions and/or of a new layout of the inventory 9. Here again, it will be noted that this programming tool 17 is preferably autonomous relative to the handling station 4, which makes it possible for the loading device 1 to be controlled independently of the directing activities of the handling station 4.

The programming tool 17 thus makes it possible to choose from among a group of pre-defined programs, and also to define a new program thanks to an interface with which it is provided.

It will be noted that such a loading device 1 is therefore independent of the structure of the handling station 4, since it is able to obtain autonomously the information that it needs regarding the status of the storage area 5. Therefore, it does not require being connected to an external controller, and can therefore be easily added onto any existing handling station 4, without modifying it. The programming tool 17 adds to this versatility the possibility of modifying the operation of the manipulator 6 to take into account new sizes of bundles 2, in terms of dimensions of the sheets 3, of numbers of sheets 3 in a bundle 2, the presence or not of inserts, etc.

The knowledge of the status of the inventory 9, both in terms of quantity and in terms of position of the bundles 2, can be accessed as long as the operation of the manipulator 6 is followed, step by step. Nevertheless, it remains necessary to be able to identify, at the start of a cycle for transfer to the storage area 5, the exact configuration of the inventory 9. This inventory 9 is actually generally a group of bundles 2 or sheets 3 on a pallet, brought by an operator. The position of the pallet as well as the position of the bundles 2 on the pallet can therefore vary. In addition, it is possible to bring production to a halt when the inventory 9 is not unloaded, to change size, for example. In this case, the pallet and its remaining contents are released, then reused later, during a new production cycle. Thus, generally, at the start of a new cycle, the bundles 2 in the inventory 9 can have an unknown configuration. It is therefore necessary to begin the cycle of provisioning the storage area 5 by identifying the geometric configuration of the inventory 9. In a preferred embodiment of the invention, this is accomplished by use of the manipulator 6.

In this embodiment, the manipulator 6 is equipped with a sensor 16 in the area of the tool 7, and, at the start of the cycle, a step is carried out that detects the status of the inventory 9, during which the tool 7, and therefore the sensor 16 that it carries, is moved to scan the space intended for the inventory 9 and thus to detect the volume occupied by the inventory 9, and therefore to determine where the bundles 2 to be picked up are found. The sensor 16 can be a proximity sensor, for example, with a laser beam, object-sensing type. The sensor 16 is preferably oriented in the opposite direction from the part for fastening the tool 7 to the actuator 8.

As a result of the scanning of the inventory 9 by the sensor 16, the invention may also quantify the dimensions of a single bundle 2. Alternatively, these values can be specified by a user, e.g. chosen from among several possible dimensions. In these cases, the tool 7 therefore also ensures a function for detecting the inventory 9 to be handled. Here, it will be noted that the contour detected by the sensor 16 can then be compared to an anticipated configuration for the size, and a possible inconsistency, arising from, for example, a supply error, can be detected and identified.

Figure 3:
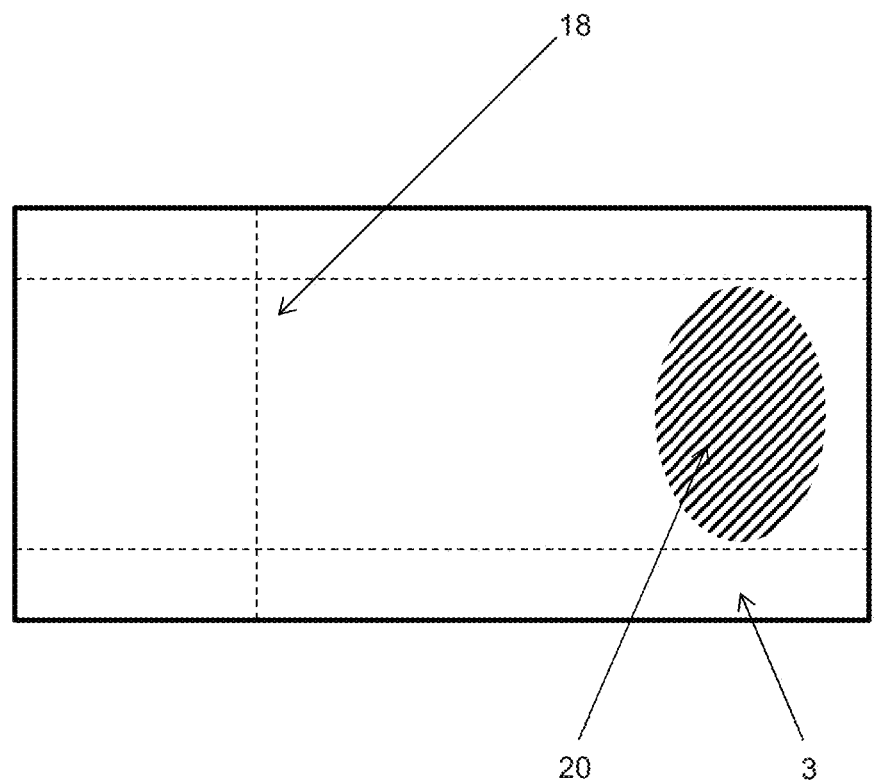
FIG. 3 diagrams a sheet with pre-defined folding zones.

Since the sheets 3 are intended to form boxes by folding, they generally exhibit linear folding areas 18, and may also be provided for a facilitated folding, such as pre-folding lines. The bottom of the boxes to be formed is generally rectangular, and the folding area 18 extends linearly perpendicular to this bottom, along these sides that are then vertical if the bottom is horizontal. In folded configuration, the sheet 3 is formed by the sides of the future box, see FIG. 3, from which the blanks extend that will form the bottom. The linear folding area 18 thus extends between two sides of the box that are perpendicular to one another, and therefore between two edges of the sheet 3 that are parallel to it and that will form the segments of the box formed, which may be closer to one edge than the other for the box configurations having a non-square, rectangular bottom.

As has been already specified, the bundles 2 of sheets 3 can have a binding 13 that keeps these sheets 3 together. Seen according to FIG. 3, this binding 13 can be, relative to the folding area 18, and therefore to the segments that will form the edges that are perpendicular to the bottom of the box, either parallel and therefore from top to bottom in FIG. 3, or perpendicular, and therefore from left to right. Once the bundle 2 is deposited in the storage area 5, its longest part can thus be either vertical or horizontal.

Figure 2:
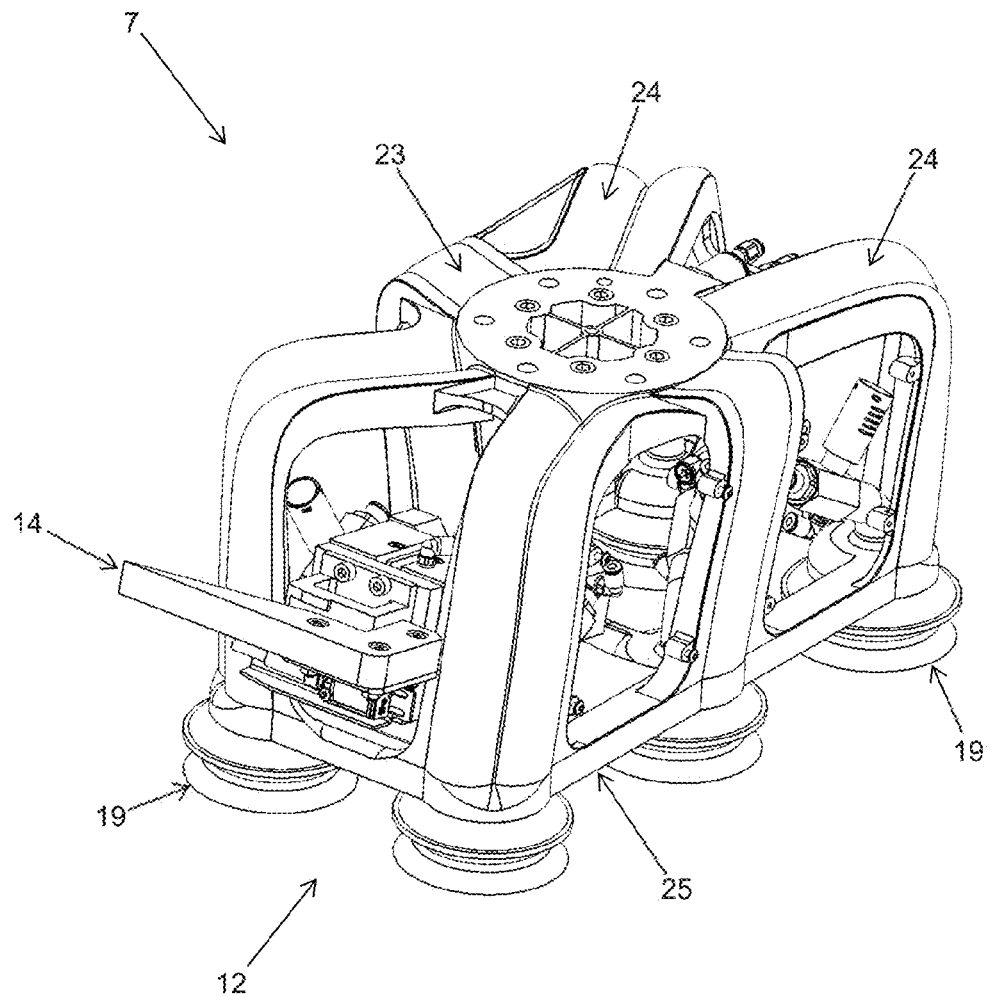
FIG. 2 shows a detail view of a gripping tool.

As FIG. 2 shows, the tool 7 preferably exhibits a set of suction cups 19 that together form a surface from which the manipulator 6 picks up the bundles 2. During the maneuver of taking a bundle 2 to lift it up, it is then preferable to apply the tool 7 in a pick-up area 20 that is located essentially between the folding area 18 and the parallel edge of the sheets 3 that is the farthest away, preferably at equal distance between the two perpendicular edges. By picking up the upper sheet 3 of the bundle 2 in this manner, the deformation of the first sheet 3 is limited under the effect of the weight of the bundle 2 during the transfer to the storage area 5, and generally, the deformation of the bundle 2 is limited. Such a deformation is generally followed by a degrading of the mechanical characteristics of the sheet 3, by the folding of the folding areas 18 in the opposite direction or else by crushing caused by the binding 13. Furthermore, the advantages of such a pick-up area 20 are found for sheets 3 of almost all dimensions. The picking up in the area of such a pick-up area 20 therefore contributes to the versatility of the loading device 1, since the same logic for governing the pick-up can be used each time.

Of course, it is preferable to move the sheets 3 from the inventory 9 to the storage area 5 when they are still held together by a binding 13, which then has to be cut so that the sheets 3 of the bundle 2 can be used one after the other.

To do this, the loading device 1 preferably has a cutting means 14, which cuts such a binding 13 that encircles the sheets 3 of a bundle 2. The cutting means 14 is advantageously mounted on the tool 7 itself, so that the latter also ensures a function of cutting the binding 13, and then, as described further on, of releasing to a shredder 15.

Figure 4:
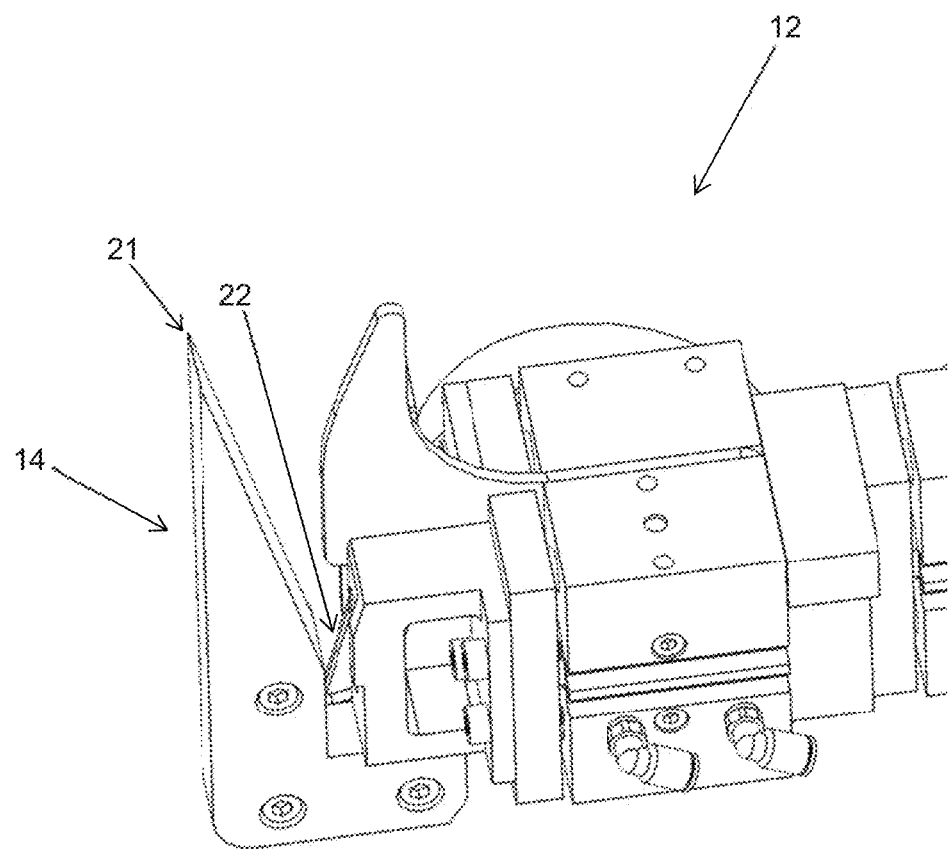
FIG. 4 shows a detail of the gripping tool for cutting a binding around bundles.

The cutting means 14 comprises a gripper 12 that can hold the binding 13 once cut. As FIG. 4 shows, the cutting means 14 also has a sharp lip 21 to come between the binding 13 and the bundle 2, this lip 21 preferably forming a jaw of the gripper 12. The cutting means 14 also comprises a movable blade 22. For the operation for cutting the binding 13, the tool 7 is moved so that the lip 21 is inserted by its end part between the binding 13 and the bundle 2, then the gripper 12 is actuated to pick up the binding 13. The movable blade 22 is then moved to slice the binding 13. The tool 7 can then be moved and the binding 13 brought with it, held in the gripper 12.

In a preferred embodiment, the loading device 1 also comprises a shredder 15 where the tool 7 releases the binding 13. Such a shredder 15 located in the area of movement of the manipulator 6, is provided to cut up the binding 13 into a plurality of smaller segments, which facilitates the storing of the bindings 13 cut in the course of a cycle.

In a yet further preferred embodiment, the cutting means 14 is mounted on a damper, preferably of the cylinder type, which prevents the movement of the manipulator 6 from damaging the bundle 2 by exerting an excessive pressure on it when it approaches and then inserts the lip 21 under the binding 13.

The steps preferably follow one another in the following way. If the signal of the detection means 10 received by the control unit 11 corresponds to a situation in which bundles 2 must be supplied, the tool 7 approaches the next bundle 2 in the inventory 9, picks it up, then moves it to the storage area 5 to deposit it there on the conveyor, which may also cause the advance of the sheets 3. However, it is preferable to keep the possible binding 13 around the bundle 2 that has just been deposited. The weight of the bundle 2 and the cohesiveness that the binding 13 brings to it make it possible for the bundle 2, as long as the binding 13 holds the sheets 3 together, to be used as a weight ensuring that the sheets 3 downstream in the handling process by the station 4 do not slip. In practice, the sheets 3 have a generally vertical orientation in the storage area that can easily lead to crashes if the sheets 3 can slip on the conveyor from which they normally extend nearly vertically. Once the binding 13 is removed, the sheets 3, arranged essentially vertically against one another, are free to slip under the effect of the force of gravity within the storage area 5, if they are not restrained.

By continuing to hold at least the last bundle 2 by the binding 13, it is then possible to envisage that the station 4 is free of equipment dedicated to forming an upstream stop for the stack of sheets 3 in the storage area 5. A bundle 2 whose sheets are still restrained by the binding 13 can thus be used at the end of the column of sheets 3 within the storage area 5 to prevent the downstream sheets from slipping and thus to guarantee their positioning. The loading device 1 therefore preferably does not cut the binding 13 of the bundle 2 that has just been deposited and that forms the end of the column of sheets 3 in the storage area 5. Advantageously, it is after having deposited a bundle 2, and the tool 7 therefore is found in the area of the storage area 5, that it is maneuvered to be brought to the preceding bundle 2 and to remove the binding 13 from it. In normal operation, therefore, there is always at least one self-supported and stable bundle 2 to hold back the downstream sheets 3. This makes it possible to simplify the storage area 5 and therefore the station 4. In a loading sequence, it can therefore be envisaged that the tool 7 takes a bundle 2, deposits it in the storage area 5 still bound by the binding 13, and then the preceding bundle 2 is freed from its binding 13 by cutting it and then preferably taking it to the shredder 15.

FIG. 2 shows a possible embodiment of the gripping tool 7. This tool 7 is intended to be mounted at the end of an actuator 8 of the multi-axis robot type and has, to carry the bundles 2 along, a group of suction cups 19. These suction cups preferably number six, and are arranged in a compact way in a rectangle. By using a compact configuration of suction cups 19 that can ensure a high tractive force, a versatile tool 7 is obtained, on the one hand, because of reduced bulk, since the suction cups 19 are close to one another and the tool 7 can therefore engage on bundles 2 that are barely larger than the configuration that forms the group of suction cups 19, and, on the other hand, because they are able to create the force necessary to lift up a bundle 2 with numerous sheets 3 of large dimensions. The compact arrangement of powerful suction cups 19 therefore contributes to the versatility of the tool 7.

These suction cups 19 are vacuum-supplied by a system of venturis, each suction cup 19 having its own venturi.

The tool 7 has a mechanical frame 23 that is used to carry the components of the tool 7. This frame 23 carries the interface for mounting onto the actuator 8 and preferably takes the shape of a structure having arches 24, extending for each from the mounting interface to a suction cup 19. The arches 24 extend, at one part, perpendicular to the plane in which the suction cups 19 are found, and then, in another part, approximately parallel to this plane up to the mounting interface. Since the suction cups 19 are positioned by being located respectively at the angular points of a rectangle as well as in the middle of its longest edges, the arches 24 extend in two parallel aligned groups of three. A rectangular-shaped brace 25 successively adjoins the ends of the arches 24 where the suction cups 19 are found. The arches 24 therefore form the contours of a tool volume 7.

The footing of the tool 7, seen on the sheet 3 when it picks it up, preferably corresponds essentially to that of the frame 23. This means that the bulk of the elements of the tool 7 are found in the interior space of the frame 23. Of course, certain elements of the tool 7 must go beyond the frame 23, at least briefly, such as the gripper 12 that must interact with the bindings 13, or the lip 21 that must be inserted between a binding 13 and a bundle 2. The fact that the frame 23 accommodates in its interior space the bulk of the operational elements of the tool 7 also has the result of protecting said elements: venturi and associated pneumatic components, filters, etc., sensor 16, base of the cutting means 14, damper for said cutting means 14, and the like.

Finally, for the purpose of being able easily to add a loading device 1 to an already existing holding station 4, a preferred embodiment of the manipulator 6 is sensitive to the elements of its environment and thus able to detect a presence so as to anticipate impacts in its work zone. Access to the work zone of the manipulator 6 is then possible without risk to an operator, and the loading device 1 can be free of safety covering that impedes access. Different solutions can be used such as an altered operation if the loading device 1 detects a presence in the vicinity of the work area, indeed a complete stop as soon as the presence is detected in the work area, or else a quick stop in case an unforeseen impact, etc., is detected. This prevention of risks may also be accomplished by means of a set of detectors that identify an intrusion into the work zone of the manipulator 6 and that send this signal to the control unit 11, which can then cause said manipulator 6 to go into a downgraded operating mode in which the risks for an operator are zero. Such a loading device 1 free of protective covering is particularly simple to add onto an already existing station 4, and is safe and inexpensive.

With the invention thus disclosed and depicted in the accompanying drawings, an autonomous solution is provided for loading a storage area 5 of a box-forming holding station 4 that is easy to add onto any type of holding station 4, without needing a major redesign, and that is particularly versatile. A loading device 1 according to the invention is easy to adapt to different sizes of bundles 2 or of sheets 3, as well as to different types of holding station 4, which is actually a standard module.

Although the above description is based on particular embodiments, it in no way limits the scope of the invention, and modifications can be made, particularly by substitution of technical equivalents or by a different combination of all or part of the characteristics developed above.

The invention claimed is:

1. A loading device (1) to successively supply a handling station (4) with cardboard sheets (3) to be folded and thereby formed into boxes for packaging, said handling station (4) having a storage area (5) to receive the sheets (3) from the loading device (1), said loading device comprising:
   a manipulator (6) that includes a gripping tool (7) configured to pick up said sheets (3), and an actuator (8) that moves the gripping tool (7) between an inventory (9) of the sheets (3) and the receiving storage area (5) of the handling station (4);
   a detection means (10) that detects a status of filling of the storage area (5) of the handling station (4); and
   a control unit (11) that operationally directs the action of the manipulator (6) based on detection information received from the detection means (10),
   said control unit (11) being independent of control of the handling station (4), and programmable to adapt the operation of the loading device (1) to a type of the sheets (3).

2. The loading device (1) according to claim 1, wherein the gripping tool (7) is equipped with a sensor (16) that detects a shape of an assembly of the sheets (3) located in the inventory (9).

3. The loading device (1) according to claim 2, wherein the device is equipped with detectors that detect intrusions into a work environment of the manipulator (6), and upon detection of an instruction by the detectors, the control unit (11) alters the operation of the manipulator (6).

4. The loading device (1) according to claim 1, wherein the gripping tool (7) is equipped with a gripper (12) configured to connect with and lift a binding (13) positioned around a plurality of sheets (3) that holds said plurality of sheets (3) together as a bundle (2), and the gripping tool also being equipped with a cutting means (14) configured to cut said binding (13).

5. The loading device (1) according to claim 4, wherein the gripping tool (7) is equipped with a set of pneumatic suction cups (19) configured to attach to and pick up a sheet (3).

6. The loading device (1) according to claim 4, wherein the device is equipped with detectors that detect intrusions into a work environment of the manipulator (6), and upon detection of an instruction by the detectors, the control unit (11) alters the operation of the manipulator (6).

7. The loading device (1) according to claim 1, wherein the gripping tool (7) is equipped with a set of pneumatic suction cups (19) configured to attach to and pick up a sheet (3).

8. The loading device (1) according to claim 7, wherein the device is equipped with detectors that detect intrusions into a work environment of the manipulator (6), and upon detection of an instruction by the detectors, the control unit (11) alters the operation of the manipulator (6).

9. The loading device (1) according to claim 1, wherein the device is equipped with detectors that detect intrusions into a work environment of the manipulator (6), and upon detection of an instruction by the detectors, the control unit (11) alters the operation of the manipulator (6).

10. The loading device (1) according to claim 2, wherein the gripping tool (7) is equipped with a gripper (12) configured to connect with and lift a binding (13) positioned around a plurality of sheets (3) that holds said plurality of sheets (3) together as a bundle (2), and the gripping tool also being equipped with a cutting means (14) configured to cut said binding (13).

11. The loading device (1) according to claim 2, wherein the gripping tool (7) is equipped with a set of pneumatic suction cups (19) configured to attach to and pick up a sheet (3).

12. A process for loading sheets (3) in a storage area (5) of a station (4) for handling said sheets (3) by folding said sheets into boxes, the process comprising:
    transferring, by use of a manipulator (6) of a loading device (1), sheets (3) from an inventory (9) to said storage area (5) of the handling station (4);
    wherein the transferring step includes the step of:
    detecting, by use of a detection means (10) of said loading device (1), a load status of the storage area (5),
    wherein the manipulator (6) is operated on the basis of said detecting and by way of a predefined program governed by a control unit (11) of the loading device (1), said control unit (11) arranged such that said control unit (11) does not control an operation of the handling station (4).

13. The loading process according to claim 12,
    wherein the loading device (1) is provided with a manipulator (6) that is equipped with an actuator (8) and a gripping tool (7) provided on an end of the actuator (8), the gripping tool (7) comprising a set of suction cups, and
    wherein the step of transferring is carried out by:
        positioning the gripping tool (7) approximately in a middle of a one of said sheets (3) between two large edges of the sheet (3) and in an area of a short edge of the sheet (3) that is far from a zone of folding of the sheet (3).

14. The loading process according to claim 12, wherein during travel between the inventory (9) and the storage area (5), a sheet of said sheets (3) is brought at least temporarily to bear on an outside support relative to which the sheet (3) is subsequently moved, by any of rotation and translation.

15. Loading process according to claim 12, further comprising:
    cutting a binding (13) that holds a plurality of the sheets (3) together as a bundle (2) by use of a cutting means (14) connected to the actuator (8) of the manipulator (6).

16. The loading process according to claim 15, wherein a plurality of bundles (2), each having corresponding bindings (13), are deposited successively in the storage area (5), and
    the cutting step is omitted for the last of said plurality of bundles (2) deposited.

17. The loading process according to claim 12, wherein the load status of the inventory (9) is detected by a use of a sensor (16) located on a gripping tool (7) attached to an end of the manipulator (6), said use including a movement of the sensor (16) by way of an actuator (8) that moves the gripping tool (7) of the manipulator (6).

18. The loading process according to claim 17, further comprising:
    cutting a binding (13) that holds a plurality of the sheets (3) together as a bundle (2) by use of a cutting means (14) connected to the actuator (8) of the manipulator (6).

19. The loading process according to claim 17, wherein wherein the loading device (1) is provided with a manipulator (6) that is equipped with an actuator (8) and a gripping tool (7) provided on an end of the actuator (8), the gripping tool (7) comprising a set of suction cups, and
    wherein the step of transferring is carried out by:
        positioning the gripping tool (7) approximately in a middle of a one of said sheets (3) between two large edges of the sheet (3) and in an area of a short edge of the sheet (3) that is far from a zone of folding of the sheet (3).

20. The loading process according to claim 17, wherein during travel between the inventory (9) and the storage area (5), a sheet of said sheets (3) is brought at least temporarily to bear on an outside support relative to which the sheet (3) is subsequently moved, by any of rotation and translation.

* * * * *